(12) United States Patent
Wei et al.

(10) Patent No.: US 10,691,008 B2
(45) Date of Patent: Jun. 23, 2020

(54) PROJECTION METHOD, PROJECTOR AND PROJECTION SYSTEM OF FULLY COVERING MULTI-DIRECTIONAL CIRCULAR-SCREEN

(71) Applicant: Hangzhou YiYuQianXiang Technology Co., Ltd., Hangzhou (CN)

(72) Inventors: Pingting Wei, Hangzhou (CN); Ruizi Qin, Hangzhou (CN)

(73) Assignee: HANGZHOU YIYUQIANXIANG TECHNOLOGY CO., LTD., Hangzhou (CN)

( * ) Notice: Subject to any disclaimer, the term of this patent is extended or adjusted under 35 U.S.C. 154(b) by 158 days.

(21) Appl. No.: 15/979,383

(22) Filed: May 14, 2018

(65) Prior Publication Data

US 2018/0329283 A1    Nov. 15, 2018

(30) Foreign Application Priority Data

May 12, 2017 (CN) .......................... 2017 1 0335481
Sep. 29, 2017 (CN) .......................... 2017 1 0908921

(51) Int. Cl.
| G03B 21/60 | (2014.01) |
|---|---|
| H04N 9/31 | (2006.01) |
| G03B 37/04 | (2006.01) |
| G03B 21/00 | (2006.01) |
| G02B 30/00 | (2020.01) |

(52) U.S. Cl.
CPC ............ *G03B 21/60* (2013.01); *G02B 30/00* (2020.01); *G03B 21/00* (2013.01); *G03B 37/04* (2013.01); *H04N 9/3147* (2013.01); *H04N 9/3185* (2013.01)

(58) Field of Classification Search
CPC ........ G03B 21/00; G03B 21/10; G03B 21/58; G03B 21/60; G03B 21/145; G03B 21/147; G02B 27/017; G02B 27/22; G02B 27/0025; G02B 27/0101; G02B 27/0172
See application file for complete search history.

(56) References Cited

U.S. PATENT DOCUMENTS

| | | | | |
|---|---|---|---|---|
| 2013/0300637 | A1* | 11/2013 | Smits ................. | G02B 27/0176 345/8 |
| 2014/0198949 | A1* | 7/2014 | Garlington ............ | G03B 21/10 382/103 |
| 2017/0316607 | A1* | 11/2017 | Khalid ................. | G06T 19/006 |

* cited by examiner

*Primary Examiner* — Sultan Chowdhury
(74) *Attorney, Agent, or Firm* — Bayramoglu Law Offices LLC (57) ABSTRACT

The present invention provides a projection method, a projector and a projection system of fully covering a multi-directional circular-screen. The projection method obtains a circular-screen projection surface by dividing a visual platform to be projected; arranging each optical machine according to minimum optical path distance information. Each optical machine to be arranged projects an image onto each circular-screen projection surface to obtain a first projection coverage range; and adjusts the first projection coverage range according to setting parameters corresponding to each optical machine to be arranged according to a preset projection surface to obtain a second projection coverage range. The system calculates geometric parameters and the second projection coverage range of each optical machine to be arranged to obtain a spatial position and a rotation angle range of each optical machine to be arranged.

17 Claims, 9 Drawing Sheets

PROJECTION METHOD, PROJECTOR AND PROJECTION SYSTEM OF FULLY COVERING MULTI-DIRECTIONAL CIRCULAR-SCREEN

CROSS-REFERENCE TO RELATED APPLICATIONS

This Non-provisional application is based upon and claims priorities under 35 U.S.C. § 119(a) to Chinese Patent Application No. 201710335481.5, filed on May 12, 2017 and Chinese Patent Application No. 201710908921.1 filed on Sep. 29, 2017, the entire contents of which are hereby incorporated by reference.

TECHNICAL FIELD

The present invention relates to the technical field of imaging processing, and more particularly, to a projection method, a projector, and a projection system of fully covering multi-directional circular-screen.

BACKGROUND

A cave automatic virtual environment (CAVE) projection system is a large virtual reality (VR) system, with high degree of immersion and interactivity. The CAVE projection system can fuse vision, touch, sound and other senses, and can track head movement along 6 degrees of freedom. The principles of the CAVE immersive virtual reality display system is relatively complex. The principles are based on computer graphics, and perfectly fuses the high-resolution three-dimensional projection display technology, multi-channel visual synchronization technology, three-dimensional computer graphics technology, audio technology, sensor technology and so on. The CAVE immersive virtual reality display system is therefore able to produce a completely immersive virtual environment surrounded by a three-dimensional projection images and can be used by multiple people. At present, real-time high-resolution multi-window content rendering of a complex scene is mainly applied to the CAVE system. The CAVE projection system is a large VR system with high degree of immersion and interactivity. The CAVE projection system is a highly immersive virtual demonstration environment composed of three or more (i.e. including three) hard rear-projection walls. An observer is surrounded by a virtual reality system having a plurality of images, and a virtual space is formed by a plurality of projection surfaces. The common CAVE system projection space is a standard cubic structure, and the four independent projection channels finally form a space continuous projection image.

At present, the interior of a common projector has only one set of optical engines which are equipped with one lens. Parameters of the optical machine (i.e the optical component) determine the size of the projected projection surface, and the projection surface projected with a large wide-angle is achieved by a fisheye lens. The cost of a large wide-angle projection is expensive and the output image from the fisheye lens results in serious deformation. Due to the limitations of the parameters of the optical machine, the common projector (including household and engineering), even with the fisheye lens, cannot achieve a wrap-around 360-degree image surrounding a user when projected by only a single projector. In order to project an image that fully surrounds the user (i.e. a surrounding image), multiple projectors are required to be arranged at different positions in the space, and the images projected by the multiple projectors are spliced through edge fusion technology. However, the defect in the prior art of using multiple projectors to achieve a projection in a surrounding manner or in a large scope is that a plurality of projectors need to be hung at different positions of the projection space, the equipment is not centralized, and it is difficult to manage and maintain the equipment. Since the projector is hung at a supporting frame/suspending frame, the relative position of the supporting frame (and therefore the relative position of the projector) changes slightly with time due to the weight of the projector. The relative position of the projector will change resulting in the image of the fused edge to be misplaced. The plurality of projectors are arranged separately, but need to work collaboratively with high precision, therefore once the above misplacement occurs, it is difficult to correct and causes a variety of problems when correcting the images.

SUMMARY

An objective of the present invention is to provide a projection method, a projector and a projection system of fully covering a multi-directional circular-screen. The present invention not only achieves integrated optimization of an optical machine arrangement, and breaks through limitation of an optical element of a projector with single optical machine; but also reduces the price of a professional grade projector to the price point of a common household projector while achieving multi-directional circular-screen projection. In addition, in the projection geometrical region, the projection image can be projected as any size and at any position.

The present invention provides a projection method for fully covering a multi-directional circular-screen including the following steps:

dividing a visual platform to be projected to obtain a circular-screen projection surface, and making each optical machine to be arranged project an image onto the circular-screen projection surface to obtain optical path distance information;

arranging each optical machine to be arranged according to minimum optical path distance information, and making each optical machine to be arranged project the image onto the corresponding circular-screen projection surface according to an arrangement result to obtain a first projection coverage range;

according to setting parameters corresponding to each optical machine to be arranged, adjusting the first projection coverage range in accordance with a preset projection surface to obtain a second projection coverage range; and obtaining geometric parameters of each optical machine to be arranged, and calculating the geometric parameters and the second projection coverage range to obtain a spatial position and a rotation angle range of each optical machine to be arranged.

Further, dividing the visual platform to be projected to obtain the circular-screen projection surface may include the following steps:

setting one surface of a cube of the visual platform to be projected as a setting surface, and obtaining preset position information of a center of the setting surface; and dividing the visual platform to be projected in accordance with a quadrant based on the preset position information, to obtain the circular-screen projection surface.

Further, according to the setting parameters corresponding to each optical machine to be arranged, adjusting the first projection coverage range according to the preset projection surface to obtain the second projection coverage range may include following steps:

obtaining the setting parameters corresponding to each optical machine to be arranged, and the setting parameters including a throw ratio, a circular-screen projection surface ratio, a vertical ratio and a keystone correction tolerance;

adjusting the first projection coverage range according to the throw ratio, the circular-screen projection surface ratio, the vertical ratio and the keystone correction tolerance, and comparing an adjustment result with the preset projection surface; and if the adjustment result is consistent with the preset projection surface, obtaining the second projection coverage range.

Further, calculating the geometric parameters and the second projection coverage range to obtain the spatial position and the rotation angle range of the optical machine to be arranged may include the following steps:

adjusting a spatial horizontal position and a rotation angle of each optical machine to be arranged according to the second projection coverage range, to calculate whether an optical path coverage range of each optical machine to be arranged is within the circular-screen projection surface; and when the optical path coverage range of the optical path coverage range is within the circular-screen projection surface, outputting the spatial position and the rotation angle range of each optical machine to be arranged according to the geometric parameters of each optical machine to be arranged.

Further, the projection method of fully covering multi-directional circular-screen provided by the present invention may further include the following steps:

scanning the circular-screen projection surface after obtaining the first projection coverage range, to obtain surface horizontal parameters and surface vertical parameters; and adjusting the first projection coverage range according to the setting parameters, the surface horizontal parameters and the surface vertical parameters.

Correspondingly, the present invention further provides a projector of fully covering multi-directional circular-screen, including a machine body, a circuit board disposed in the machine body and a power supply disposed at the circuit board, and the projector further includes a plurality of optical machines arranged according to the above-mentioned projection method;

and the optical machines are connected with the circuit board and the power supply, respectively, and are disposing at the circuit board according to the minimum optical path distance information.

Further, the optical machines may be set in a surrounding manner.

Further, the number of the optical machines may be four, and the four optical machines may be set to project images onto the corresponding circular-screen projection surfaces simultaneously when being used for projection.

Further, the projector of fully covering the multi-directional circular-screen provided by the present invention may further include a projector spatial position and rotation angle range information output machine; and the projector spatial position and rotation angle range information output machine may be disposed between the optical machines and the circuit board, the circular-screen projection surface may include a plurality of sub-surfaces with the same size during projection, each sub-surface corresponds to one optical machine, fusing zones may be formed between the images projected by the optical machines onto corresponding sub-surface screens, and the fusing zones may be controlled within a predetermined width according to information of the projector spatial position and rotation angle range.

Correspondingly, the present invention further provides a projection system of fully covering a multi-directional circular-screen including a visual platform and further including the projector.

Compared with the prior art, the present technical solution has following advantages:

the present invention provides the projection method, projector and projection system of fully covering the multi-directional circular-screen. The present invention obtains the circular-screen projection surface by dividing the visual platform to be projected; arranges each optical machine to be arranged according to the minimum optical path distance information that each optical machine to be arranged being projected to each circular-screen projection surface to obtain the first projection coverage range; and adjusts the first projection coverage range according to the setting parameters corresponding to each optical machine to be arranged. The invention further uses the preset projection surface to obtain the second projection coverage range; and calculates the geometric parameters and the second projection coverage range of each optical machine to be arranged to obtain the spatial position and the rotation angle range of each optical machine to be arranged. The present invention achieves integrated optimization of an optical machine arrangement, and breaks through limitation of an optical element of a projector with single optical machine. The present invention provides the single projector with multiple optical machines which achieve covering one circle and projecting in the surrounding manner, and fills in the blank that the projector projects in the surrounding manner under small and medium spaces (not engineering scale). The present invention reduces the price of an engineering projector to a household level while achieves multi-directional circular-screen projection. In addition, in the projection geometrical region, the projection image can be arranged as any size and at any position.

For the projector of fully covering the multi-directional circular-screen provided by the present invention, a single device in the volume and price aspects enters from an engineering level into a household level, and this invention provides a projector which can achieve one circle projection in any space, especially in the household scale space at a much more reasonable price point.

The projection system of fully covering the multi-directional circular-screen provided by the present invention, includes the visual platform and the projector. The price is at the household level, the installation and deployment are simple, the projection is large-screen, panoramic, and seamless.

In the figures: 1 circuit board; 2 power supply; 3 optical machine; 4 projector spatial position and rotation angle range information output machine; and 5 machine body.

DETAILED DESCRIPTION

The above-mentioned and other technical features and advantages of the present invention will be clearly and completely described hereinafter with reference to the accompanying drawings. Apparently, the described embodiments are part of the embodiments instead of all of the embodiments of the present invention.

Figure 1:
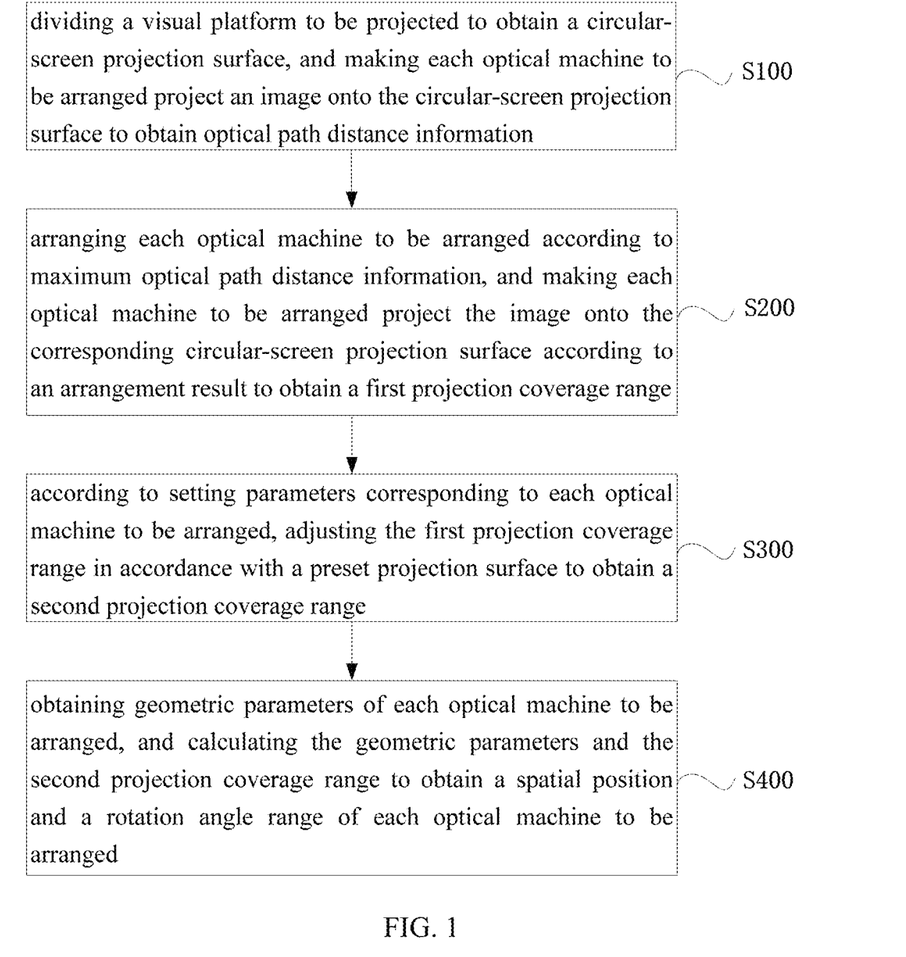
FIG. 1 is a flow schematic diagram of a projection method of fully covering multi-directional circular-screen provided by a first embodiment of the present invention.

Please refer to FIG. 1. A projection method of fully covering a multi-directional circular-screen provided by the first embodiment of the present invention includes the following steps:

S100 dividing a visual platform to be projected to obtain a circular-screen projection surface, and making each optical machine to be arranged project an image onto the circular-screen projection surface to obtain optical path distance information;

S200 arranging each optical machine to be arranged according to minimum optical path distance information, and making each optical machine to be arranged project the image onto the corresponding circular-screen projection surface according to an arrangement result to obtain a first projection coverage range;

S300 adjusting the first projection coverage range in accordance with a preset projection surface according to setting parameters corresponding to each optical machine to be arranged, to obtain a second projection coverage range; and S400 obtaining geometric parameters of each optical machine to be arranged, and calculating the geometric parameters and the second projection coverage range to obtain a spatial position and a rotation angle range of each optical machine to be arranged.

It should be noted that, each optical machine to be arranged has a one-to-one corresponding relationship with the circular-screen projection surface, that is, one optical machine projects the image correspondingly to one circular-screen projection surface. The optical path distance information is a vertical distance that the optical machine projects the image onto the corresponding circular-screen projection surface. The optical path distance information that one optical machine projects an image to each circular-screen projection surface is compared and the minimum optical path distance information is selected. The corresponding optical machine is arranged according to the minimum optical path distance information. Each optical machine to be arranged is previously calculated and arranged according to the above-mentioned steps to obtain the first projection coverage range; and of course, the spatial position and rotation angle of the arranged optical machine are not final. The number of the circular-screen projection surfaces is at least three. Preferably, the number of the projection surfaces is four, that is, the number of the correspondingly arranged optical machines to be arranged is four.

The first projection coverage range may have two kinds. The first kind is that a projection surface formed by one optical machine that projects the image onto the corresponding circular-screen projection surface, and then the first projection coverage range is adjusted according to the setting parameters corresponding to each optical machine to be arranged and in accordance with the preset projection surface. The first projection coverage range needs to be sequentially adjusted one by one until the adjustment of all the first projection coverage is completed. For example, the first projection coverage range is calculated within the set circular-screen projection surface according to the basic parameters such as the throw ratio, circular-screen projection surface ratio, vertical ratio, keystone correction tolerance and so on. The calculation process is carried out in sequence. A vertical surface (screen) of one of the circular-screen projection surfaces is selected, and the spatial position of the optical machine in a corresponding region is determined according to the first projection coverage range; and the calculation of the other circular-screen projection surfaces are completed one by one after completing the calculation of the current wall surface. The second kind is that a projection surface formed by all optical machines project the images onto the corresponding circular-screen projection surfaces; and the first projection coverage range formed by the projection of all the optical machines is adjusted at the same time to obtain the second projection coverage range. However, the second projection coverage range which is a geometrical coverage region of the optical path three-dimensional space achieving the projection screen is not limited to a continuous image in a complete surrounding manner. In the geometrical coverage region of the optical path three-dimensional space, the projection screen can be arranged as any size and at any position.

The geometric parameters of each optical machine to be arranged include a size parameter of each optical machine to be arranged. The geometric parameters of each optical machine also include a size parameter of the circuit board for the optical machines and a size parameter of the projector spatial position and rotation angle range information output machine. The final arrangement position and the final arrangement angle of the optical machines are calculated according to the size parameter of each optical machine to be arranged, the size parameter of the circuit board at each optical machine and the size parameter of the projector spatial position and rotation angle range information output machine to generate information of the spatial position and the rotation angle range of the optical machines.

The present invention provides the projection method, projector and projection system of fully covering a multi-directional circular-screen, wherein the projection method obtains the circular-screen projection surface by dividing the visual platform to be projected, arranges each optical machine to be arranged according to the minimum optical path distance information that each optical machine to be arranged projects the image onto each circular-screen projection surface to obtain the first projection coverage range; and adjusts the first projection coverage range according to the setting parameters corresponding to each optical machine to be arranged and in accordance with the preset projection surface to obtain the second projection coverage range; and calculates the geometric parameters and the second projection coverage range of each optical machine to be arranged to obtain the spatial position and the rotation angle range of each optical machine to be arranged. The present invention achieves integrated optimization of an optical machine arrangement, and breaks through the limitation of an optical element of a projector with a single optical machine. The present invention provides a single projector with multiple optical machines which achieves one circle projection and projecting in the surrounding manner and fills in the blank that the projector projects in the surrounding manner under small and medium spaces (not engineering scale). The present invention reduces the price of an engineering projector to a household level while achieves the multi-directional circular-screen projection. In addition, in the projection geometrical region, the projection image can be arranged as any size and at any position.

Figure 2:
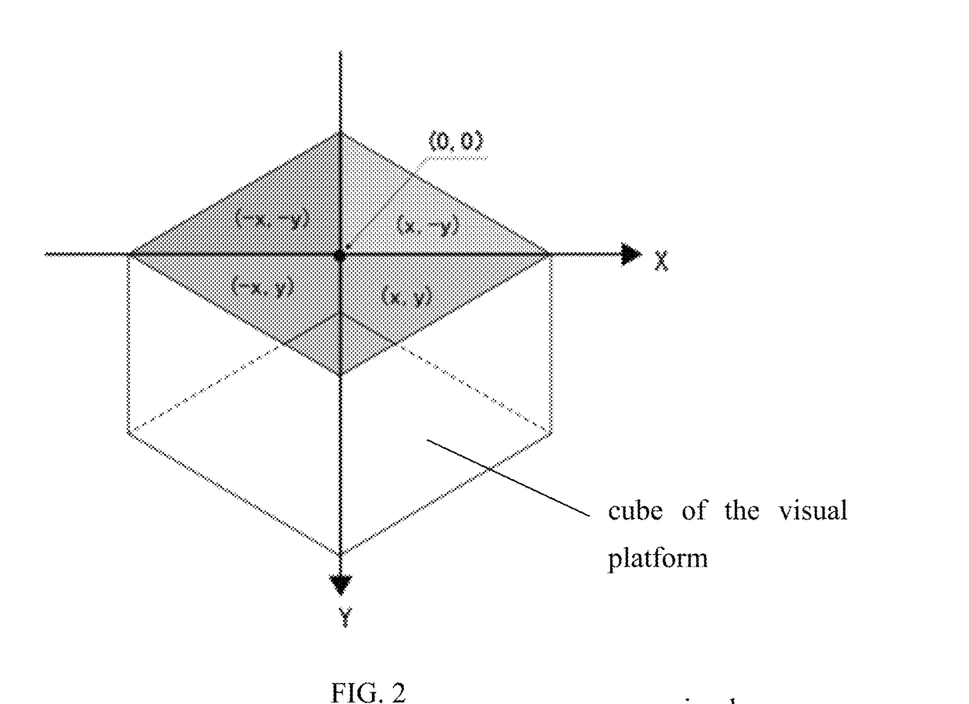
FIG. 2 is a schematic diagram of a 45° axonometric drawing of an XY plane of dividing a visual platform to be projected provided by a second embodiment of the present invention.
Figure 3A:
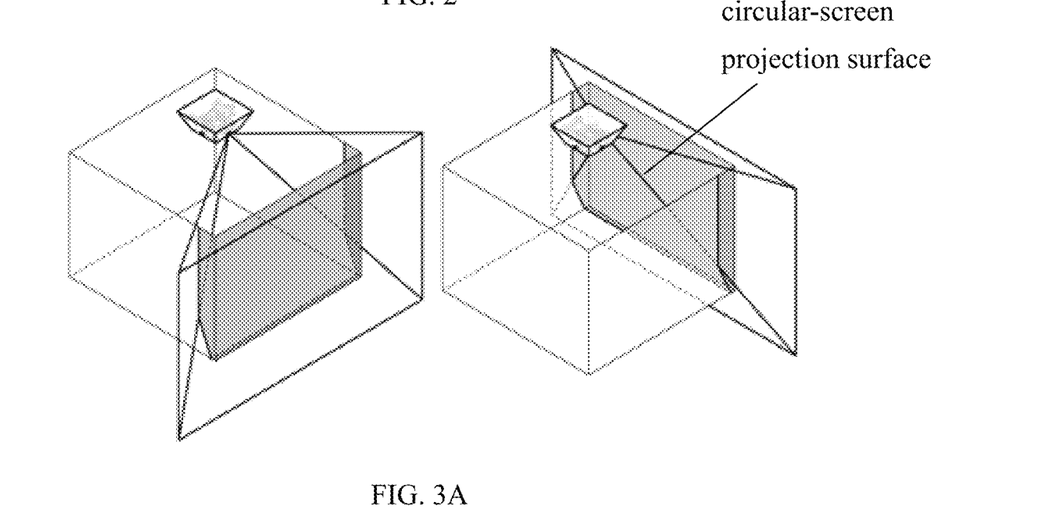
FIG. 3A is a three-dimensional schematic diagram of an optical region of a single optical machine partly covering wall surface or projection screen in a surrounding region of a calculating process of a spatial position and a rotation angle range of each optical machine to be arranged provided by a second embodiment of the present invention.
Figure 3B:
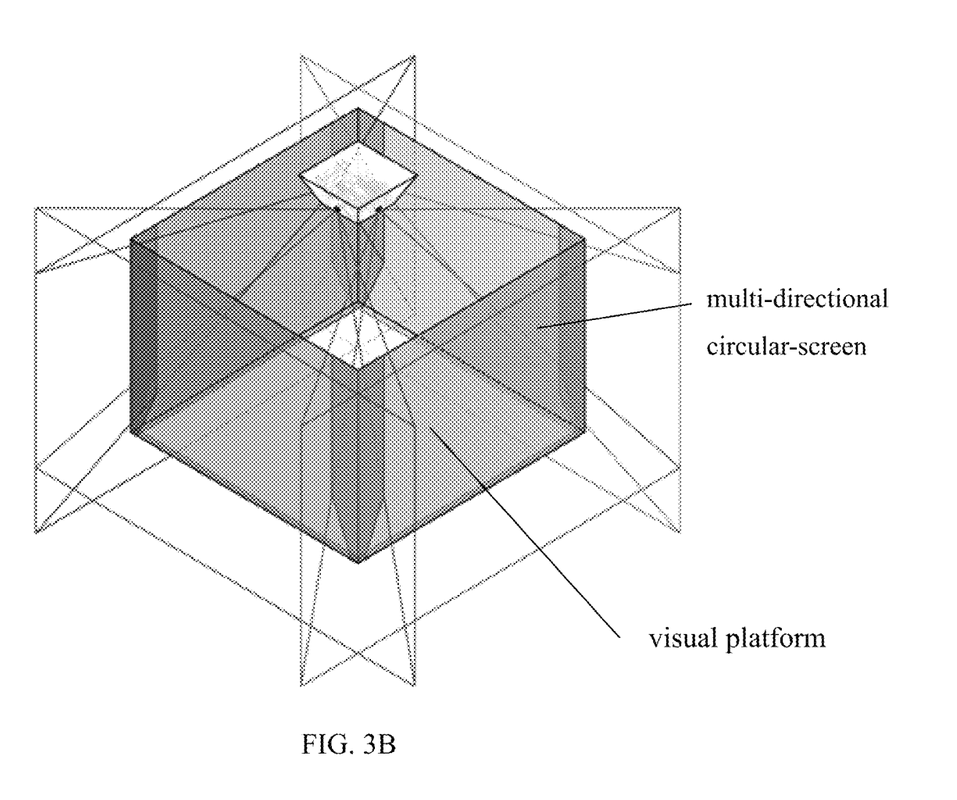
FIG. 3B is a three-dimensional schematic diagram of an optical region of multiple optical machines fully covering wall surface or projection screen in the surrounding region of the calculating process of the spatial position and the rotation angle range of each optical machine to be arranged provided by a second embodiment of the present invention.
Figure 4A:
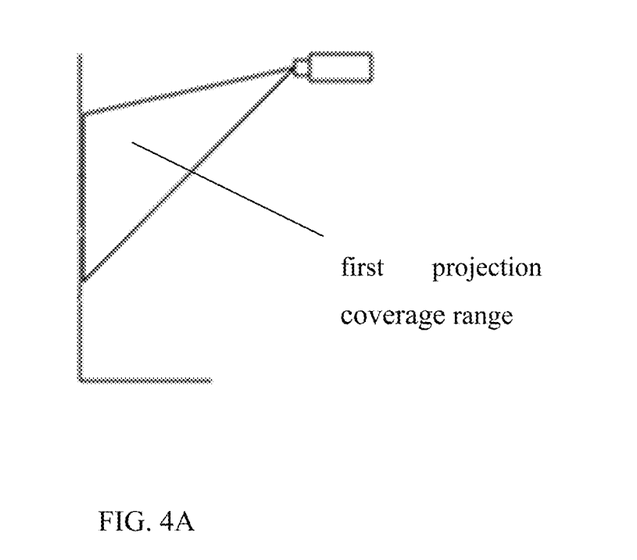
FIG. 4A is a plane schematic diagram of an optical path coverage range of a horizontal arranged optical machine of the calculating process of the spatial position and the rotation angle range of each optical machine to be arranged provided by a second embodiment of the present invention.
Figure 4B:
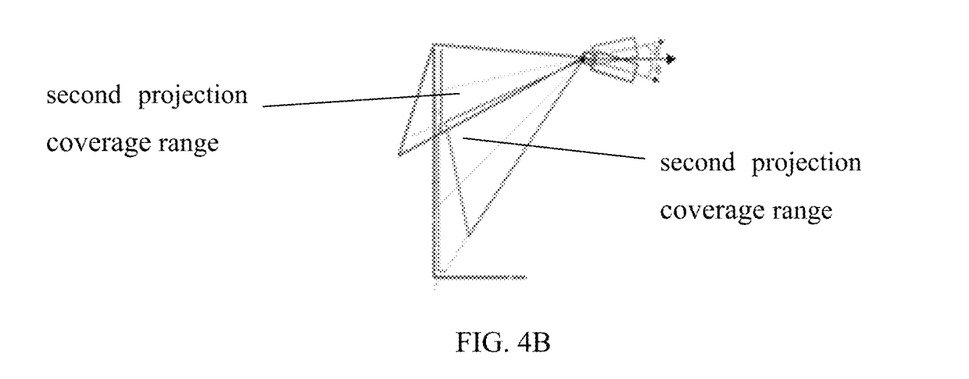
FIG. 4B is a plane schematic diagram of adjusting an ideal angle position of each optical machine according to a coverage screen area of the calculating process of the spatial position and the rotation angle range of each optical machine to be arranged provided by a second embodiment of the present invention.

FIG. 2 is a schematic diagram of a 45° axonometric drawing of an XY plane of dividing a visual platform to be projected provided by the second embodiment of the present invention which includes following steps:

S110 setting one surface of a cube of the visual platform to be projected as a setting surface, and obtaining preset position information of a center of the setting surface; and S120 dividing the visual platform to be projected in accordance with a quadrant according to the preset position information, to obtain the circular-screen projection surface.

The center of the setting surface can refer to the origin (0, 0) in FIG. 2. The specific process of the above-mentioned steps is as follows: the origin is regarded as the center of the setting surface, that is, the preset position information is (0, 0) and is developed one by one according to quadrants in four directions (x,y), (x, −y), (−x, −y), (−x, y); and that is, the visual platform to be projected is developed into four circular-screen projection surfaces one by one.

Further, the calculation process of the spatial position and the rotation angle range of each optical machine to be arranged is described in detail, which is shown as FIG. 3A, FIG. 3B, FIG. 4A, FIG. 4B and FIG. 5.

According to the setting parameters corresponding to each optical machine to be arranged, adjusting the first projection coverage range according to the preset projection surface to obtain the second projection coverage range includes the following steps:

S310 obtaining the setting parameters corresponding to each optical machine to be arranged, and the setting parameters including a throw ratio, a circular-screen projection surface ratio, a vertical ratio and a keystone correction tolerance;

S320 adjusting the first projection coverage range according to the throw ratio, the circular-screen projection surface ratio, the vertical ratio and the keystone correction tolerance, and comparing an adjustment result with the preset projection surface; and S330 if the adjustment result is consistent with the preset projection surface, obtaining the second projection coverage range.

Figure 5:
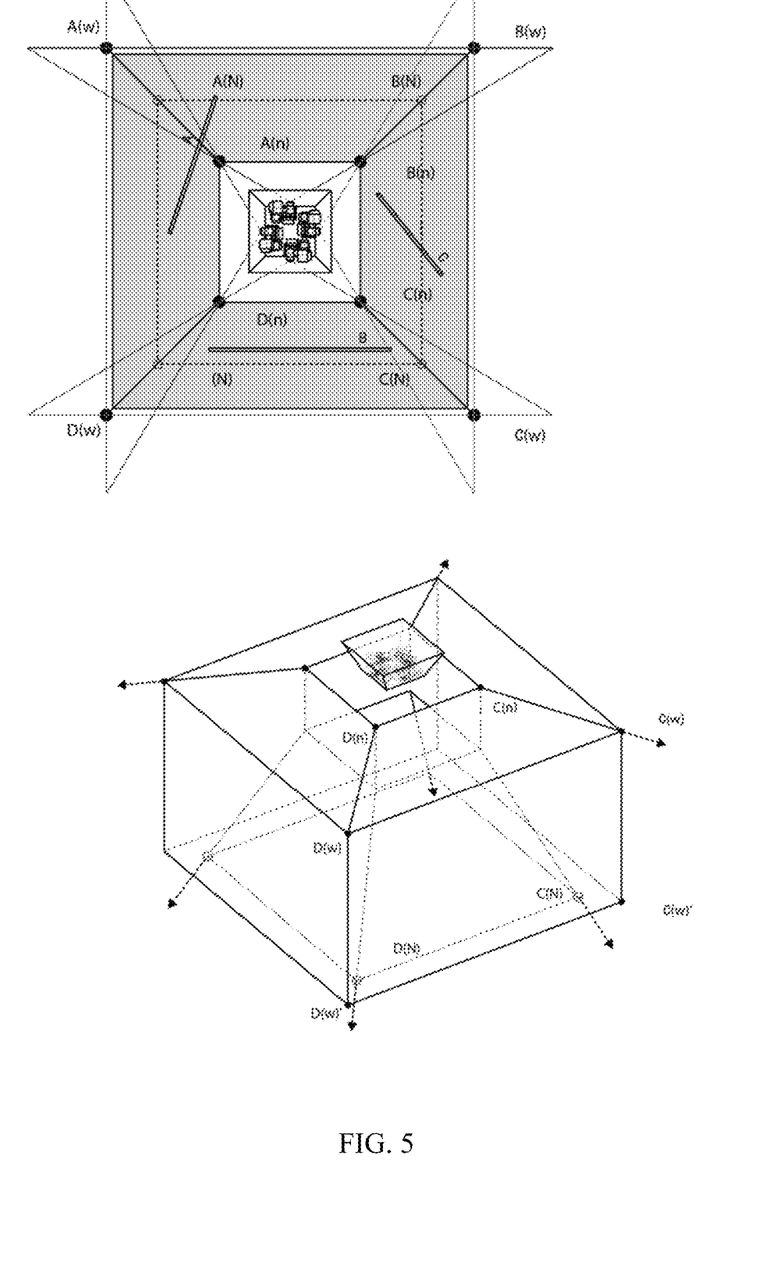
FIG. 5 is a schematic diagram of the optical region of multiple optical machines covering three-dimensional space geometric region of a second projection coverage range formed by projection of each optical machine to be arranged provided by a second embodiment of the present invention.

It should be noted that, the preset projection surface is the projection image that needs to be exhibited on the screen in practical applications. Through the adjustment of the first projection coverage range by setting the parameters, the exhibited projection image is complete, which meets the requirement of projection and improves the exhibition effect. In addition, a plurality of projection screens which are not limited to the circular-screen can be disposed within the second projection coverage range randomly. In FIG. 5, A, B and C are all projection screens; an intersection A (N)–D (N) is an intersection of the optical path and the ground; an intersection A (w)–D (w) is an intersection of outer edges of the optical path of two adjacent optical machines; and an intersection A (n)–D (n) is an intersection of inner edges of the optical path of two adjacent optical machines.

However, calculating the geometric parameters and the second projection coverage range to obtain the spatial position and the rotation angle range of each optical machine to be arranged includes the following steps:

S410 adjusting a spatial horizontal position and a rotation angle of each optical machine to be arranged according to the second projection coverage range, to calculate whether an optical path coverage range of each optical machine to be arranged is within the circular-screen projection surface; and S420 when the optical path coverage range of the optical machine to be arranged is within the circular-screen projection surface, and outputting the spatial position and the rotation angle range of the optical machine to be arranged according to the geometric parameters of each optical machine to be arranged.

The second projection coverage range is obtained by calculating according to three-dimensional space modeling. After obtaining the second projection coverage range, the spatial horizontal position and the rotation angle of each optical machine to be arranged are adjusted to calculate the optical path coverage range of each optical machine to be arranged to ensure that the optical path coverage range is within the circular-screen projection surface. In this way, in the practical process of arranging the screen, the image can be projected onto the screen arranged in the second projection coverage range only by adjusting the angle of the optional machines. In addition, the final spatial position and the rotation angle range of the optical machine to be arranged are calculated by combining with the geometric parameters of each optical machine to be arranged to output the spatial position and the rotation angle range of each optical machine to be arranged. The present invention can improve the final projection effect of the optical machine, make the screen to be any size, and randomly arrange the screen within the second projection coverage range.

Combining with FIG. 2 to FIG. 9, in applications of the technical solution of the present invention, a basic process includes three parts: an optical machine spatial position calculation, a second projection coverage range calculation and a geometric parameters and second projection coverage range calculation.

The optical machine spatial position calculation includes:

the origin (0, 0) being regarded as the preset position information and being developed one by one according to quadrants in four directions (x,y), (x, −y), (−x, −y), (−x, y); and that is, the visual platform to be projected being developed into four circular-screen projection surfaces one by one. Selecting one vertical surface (screen) in one of the quadrants, first the horizontal direction and the vertical direction are scanned, and an object coverage range is determined to be a choice basis of the corresponding optical machine to be arranged. Circular-screen projection surfaces in other quadrants can be deduced like this one by one to obtain the first projection coverage.

The second projection coverage range calculation includes:

adjusting the first projection coverage range according to the setting parameters corresponding to each optical machine to be arranged and in accordance with the preset projection surface to obtain the second projection coverage range. By inversely deducing the projection region of the first projection coverage range on the screen, an ideal position and the rotation angle on the horizontal plane of the coordinate optical machine is obtained. Then basic parameters such as the throw ratio, the circular-screen projection surface ratio, the vertical ratio, the keystone correction tolerance and so on are taken as adjustment bases.

The rotation angle θ (see FIG. 4B) between the optical machine and the horizontal plane is obtained according to the projection region in the same way.

Figure 6:
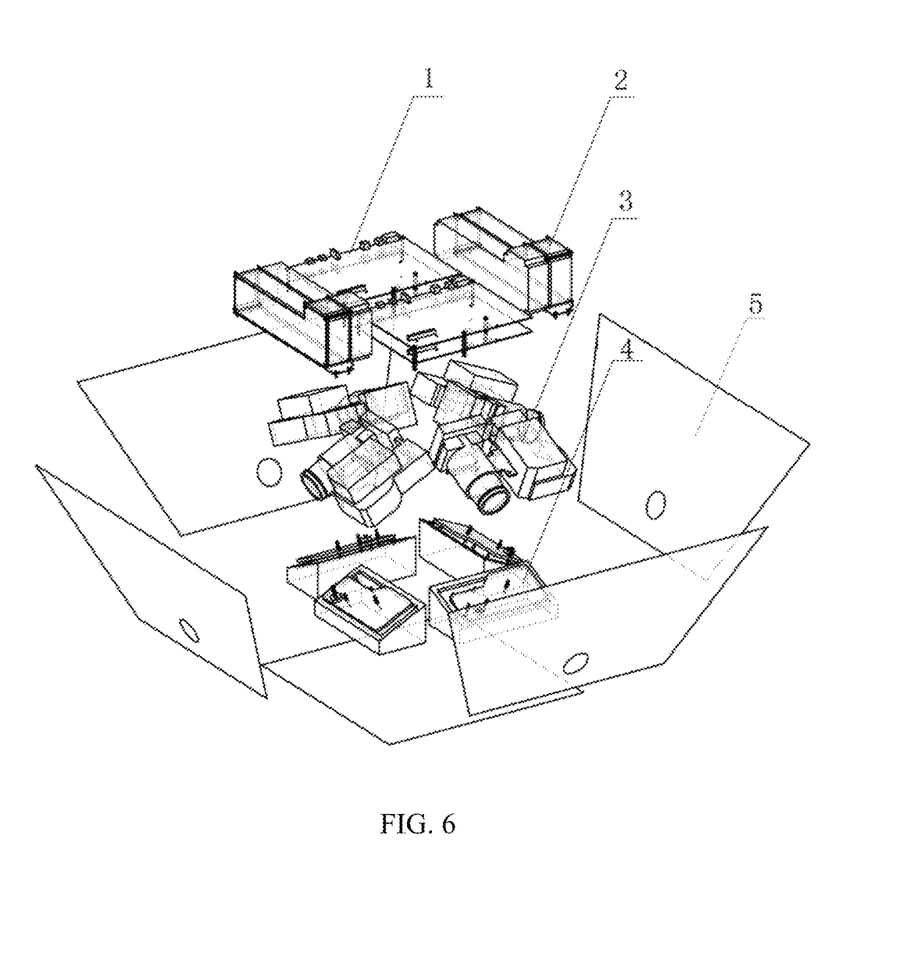
FIG. 6 is a disassembly schematic diagram of a projector of fully covering multi-directional circular-screen provided by a fourth embodiment of the present invention.
Figure 7A:
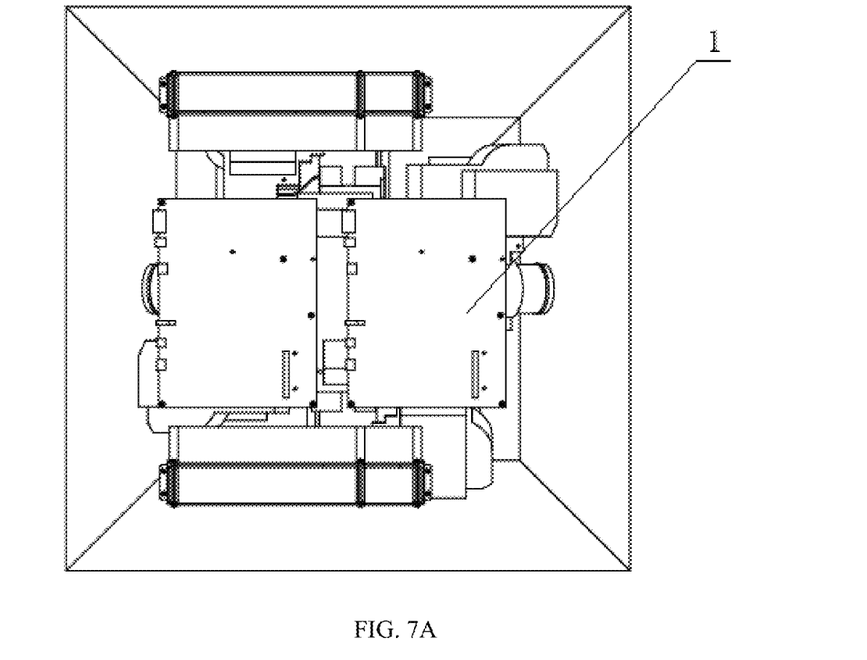
FIG. 7A is a top view of an interior arrangement of the projector in FIG. 6.
Figure 7B:
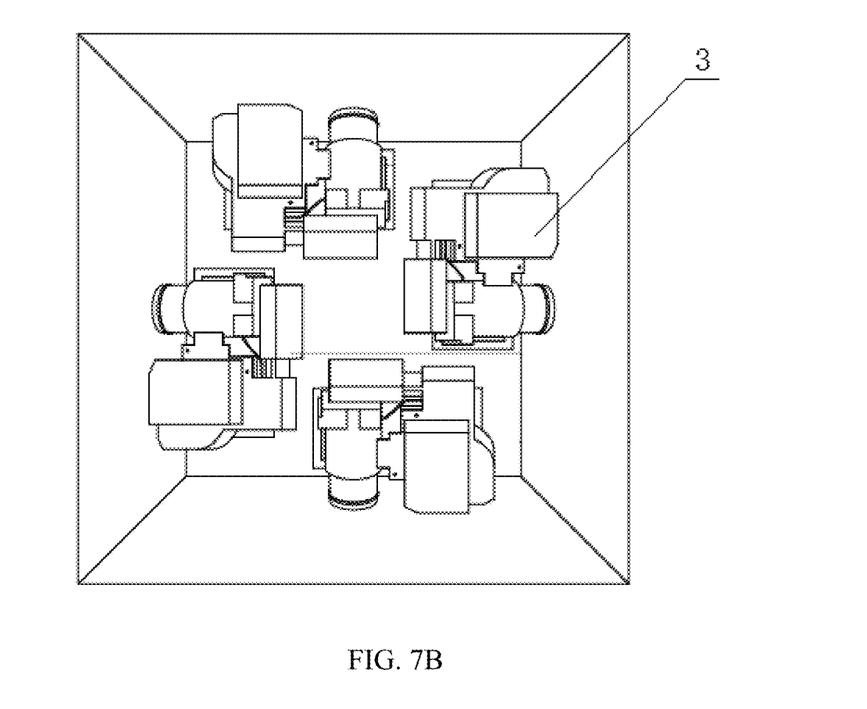
FIG. 7B is a top view of an interior optical machine arrangement of the projector in FIG. 6.
Figure 8A:
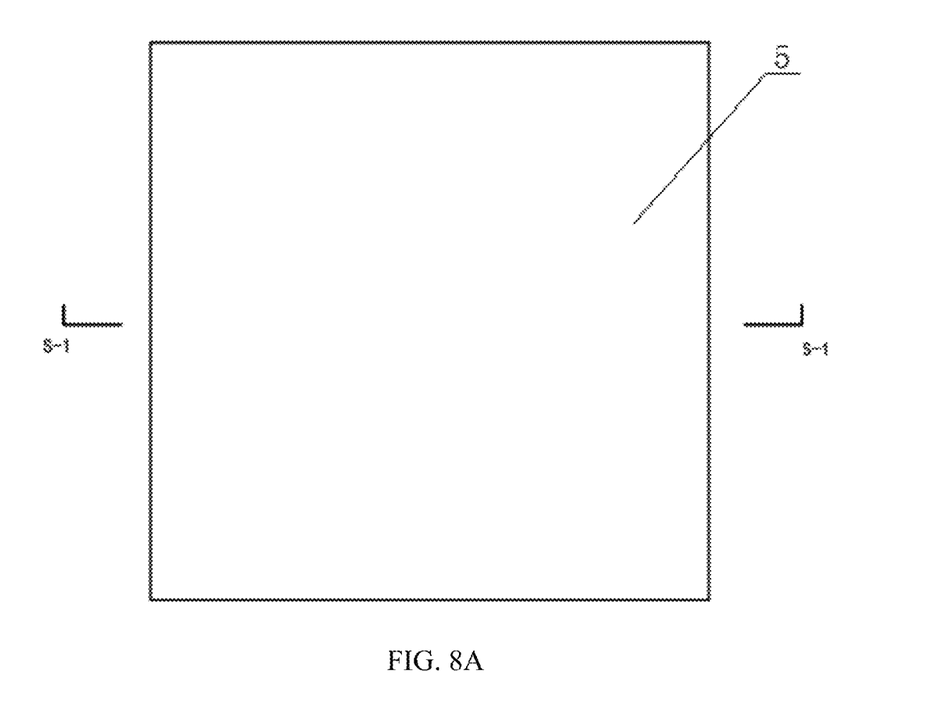
FIG. 8A is a top view of the projector in FIG. 6.
Figure 8B:
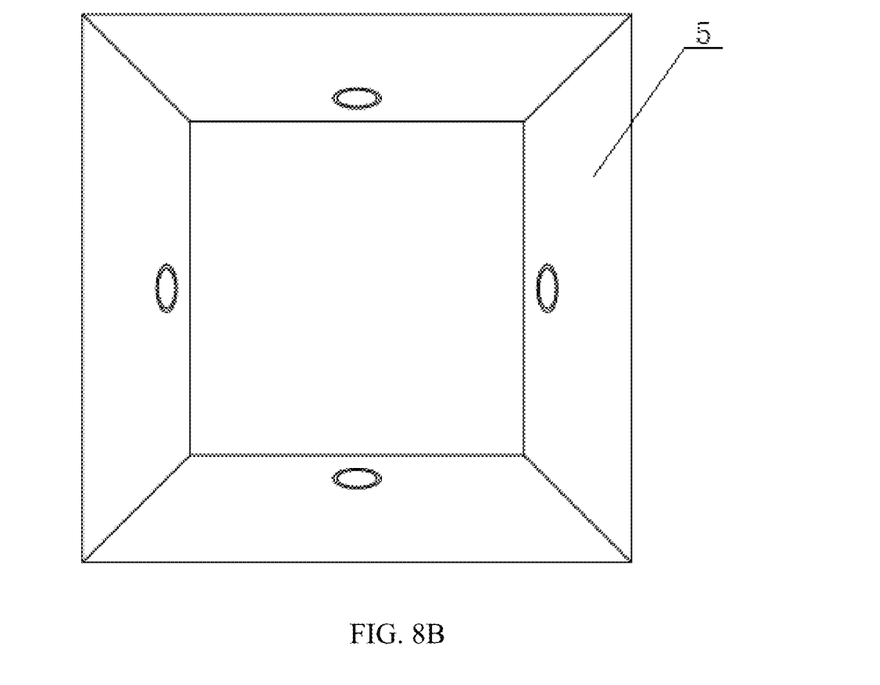
FIG. 8B is a bottom view of the projector in FIG. 6.
Figure 9A:
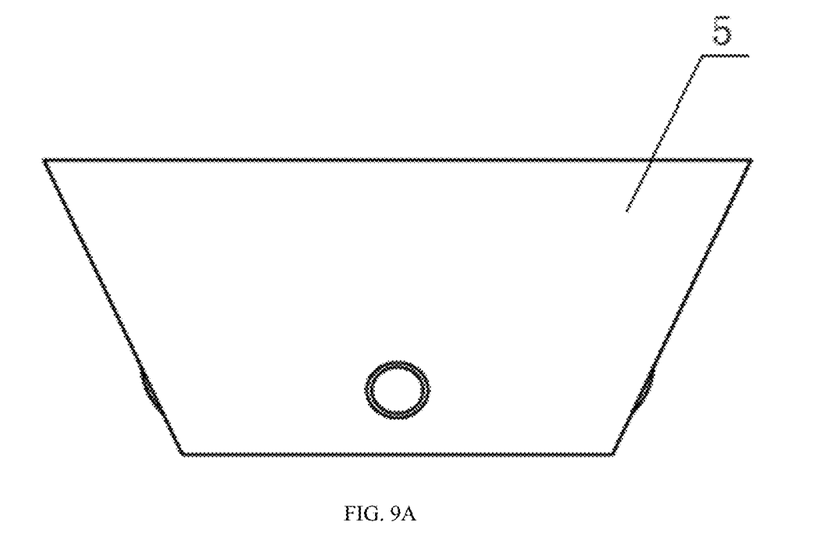
FIG. 9A is a side view of the projector in FIG. 6.
Figure 9B:
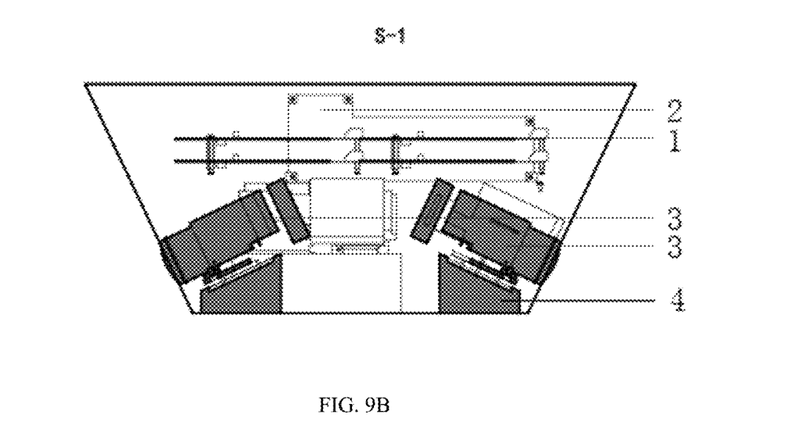
FIG. 9B is a section view of the projector in FIG. 6.

A result of the geometric parameters and second projection coverage range calculation can refer to FIG. 6 and FIG. 9. Through the optical machine spatial position calculation and the transformation of the throw ratio, combining with restrictions such as the physical size of the optical machine, the spatial condition of the projected optical path and so on, the equipment is overall arranged and optimized, and the construction of the optical machine meet the requirement of the size design is selected and exported. Finally, the spatial position and the spacial rotation angle of all four optical machines are exported.

Further, the projection method of fully covering the multi-directional circular-screen provided by the third embodiment I of the present invention compared with the first embodiment further includes the following steps:

after obtaining the first projection coverage range, scanning the circular-screen projection surface to obtain surface horizontal parameters and surface vertical parameters; and adjusting the first projection coverage range according to the setting parameters, the surface horizontal parameters and the surface vertical parameters.

Based on the same inventive concept, the embodiments of the present invention further provide a projector of fully covering multi-directional circular-screen. The projector can be implemented according to the above-mentioned method, and the repetition is not described.

FIG. 6 and FIG. 9 are disassembly schematic diagrams of the projector of fully covering multi-directional circular-screen provided by the fourth embodiment of the present invention; the projector includes a machine body 5, a circuit board 1 disposed in the machine body 5, a power supply 2 disposed at the circuit board 1 and a plurality of optical machines 3 arranged according to the projection method for fully covering the multi-directional circular-screen; and the optical machines 3 are connected with the circuit board 1 and the power supply 2, respectively, and are disposed at the circuit board 1 according to the minimum optical path distance information. The machine body 5 is provided with a projection port, and the projection port is correspondingly arranged with the optical machine 3 for the projection.

For the projector of fully covering the multi-directional circular-screen provided by the present invention, a single device in the volume and price aspects enters from an engineering level into a household level, and this invention provides the projector which can project one circle in any space, especially in the household scale space.

Further, the optical machines 3 are set in a surrounding manner. In this way, a single device can replace multiple devices thus reducing the arrangement space, improving a space utilization rate, and having a good projection effect.

Further, the number of the optical machines 3 is four. The four optical machines 3 are set to project images onto the corresponding circular-screen projection surfaces simultaneously when being used for projection. The number of optical machines is 4 and is not limited to 4, and the resolution unit of each optical machine is 2K. The volume of the projector in the present invention is only ¼ of that in the existing solution, the power consumption is only half of that in the existing solution, and a single projector in the volume and price aspects enters from an professional level into a household level. The installation and deployment are simple, the projection is large format, panoramic and seamless.

Further, the projector of fully covering the multi-directional circular-screen provided by the fifth embodiment of the present invention further includes a projector spatial position and rotation angle range information output machine 4. The projector spatial position and rotation angle range information output machine 4 is disposed between the optical machines 3 and the circuit board 1. The circular-screen projection surface includes a plurality of sub-surfaces with the same size during projection, and each sub-surface corresponding to one optical machine 3 is projected. Fusing zones are formed between the images projected by the optical machines 3 onto the corresponding sub-surface screens, and the fusing zones are controlled within a predetermined width according to information of the projector spatial position and rotation angle range.

It should be noted that the projector spatial position and rotation angle range information output machine 4 is a spatial angle supporting frame of the optical machine, which makes the optical machine 3 on the supporting frame be arranged according to the spatial position and rotation angle range. The fusing zones does not necessarily exist. Fusing zones are formed between the images projected by the optical machines 3 onto the corresponding sub-surface screens. The fusing zones are controlled within a predetermined width according to information of the projector spatial position and rotation angle range, therefore, the projection screen is not limited to the continuous image in the complete surrounding manner. In the geometrical coverage region of the optical path three-dimensional space, the projection screen can be arranged as any size and at any position.

Based on the same inventive concept, the embodiments of the present invention further provide a projection system of fully covering a multi-directional circular-screen. The system can be implemented according to the above method, and the repetition is not described.

The projection system of fully covering the multi-directional circular-screen provided by the present invention, includes the visual platform and the projector. The price is at the household level, the installation and deployment are simple, the projection is large screen, panoramic, and seamless.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A projection method of fully covering a multi-directional circular-screen, comprising the following steps:
   dividing a visual platform to be projected to obtain a circular-screen projection surface, and making each of plurality of optical machines to be arranged project an image onto the circular-screen projection surface to obtain optical path distance information;
   arranging each of the plurality of optical machines to be arranged according to minimum optical path distance information, and making each of the plurality of optical machines to be arranged project the image onto a corresponding surface of the circular-screen projection surface according to an arrangement result to obtain a first projection coverage range;
   according to setting parameters corresponding to each of the plurality of optical machines to be arranged, adjusting the first projection coverage range in accordance with a preset projection surface to obtain a second projection coverage range; and
   obtaining geometric parameters of each of the plurality of optical machines to be arranged and calculating the geometric parameters and the second projection coverage range to obtain a spatial position and a rotation angle range of each of the plurality of optical machines to be arranged.

2. The projection method of fully covering the multi-directional circular-screen according to claim 1, wherein dividing the visual platform to be projected to obtain the circular-screen projection surface comprises the following steps:
   setting one surface of a cube of the visual platform to be projected as a setting surface, and obtaining preset position information of a center of the setting surface; and
   dividing the visual platform to be projected in accordance with a quadrant, according to the preset position information, to obtain the circular-screen projection surface.

3. The projection method of fully covering the multi-directional circular-screen according to claim 1, wherein according to the setting parameters corresponding to each of the plurality of optical machines to be arranged, adjusting the first projection coverage range according to the preset projection surface to obtain the second projection coverage range comprises the following steps:
   obtaining the setting parameters corresponding to each of the plurality of optical machines to be arranged, and the setting parameters comprising a throw ratio, a circular-screen projection surface ratio, a vertical ratio and a keystone correction tolerance;
   adjusting the first projection coverage range according to the throw ratio, the circular-screen projection surface ratio, the vertical ratio and the keystone correction tolerance, and comparing an adjustment result with the preset projection surface; and
   if the adjustment result is consistent with the preset projection surface, obtaining the second projection coverage range.

4. The projection method of fully covering the multi-directional circular-screen according to claim 1, wherein calculating the geometric parameters and the second projection coverage range to obtain the spatial position and the rotation angle range of the plurality of optical machines to be arranged comprises the following steps:
   according to the second projection coverage range, adjusting a spatial horizontal position and a rotation angle of each of the plurality of optical machines to be arranged to calculate whether an optical path coverage range of each of the plurality of optical machines to be arranged is within the circular-screen projection surface; and
   when the optical path coverage range of the plurality of optical machines to be arranged is within the circular-screen projection surface, outputting the spatial position and the rotation angle range of each of the plurality of optical machines to be arranged according to the geometric parameters of each of the plurality of optical machines to be arranged.

5. The projection method of fully covering the multi-directional circular-screen according to claim 1, further comprising the following steps:
   scanning the circular-screen projection surface to obtain surface horizontal parameters and surface vertical parameters after obtaining the first projection coverage range; and
   adjusting the first projection coverage range according to the setting parameters, the surface horizontal parameters and the surface vertical parameters.

6. A projector of fully covering the multi-directional circular-screen, comprising a machine body, a circuit board disposed in the machine body and a power supply disposed at the circuit board, the projector further comprising the plurality of optical machines arranged according to the projection method of claim 1; and
   the plurality of optical machines being connected with the circuit board and the power supply, respectively, and being disposed at the circuit board according to the minimum optical path distance information.

7. The projector of fully covering the multi-directional circular-screen according to claim 6, wherein the plurality of optical machines are set in a surrounding manner.

8. The projector of fully covering the multi-directional circular-screen according to claim 7, wherein the number of the plurality of optical machines is four, and the four optical machines are set to project images to corresponding surfaces of the circular screen projection surface simultaneously when used for projection.

9. The projector of fully covering the multi-directional circular-screen according to claim 6, further comprising a projector spatial position and rotation angle range information of output machine; and wherein
   the projector spatial position and rotation angle range information of the output machine being disposed between the plurality of optical machines and the circuit board, the circular-screen projection surface comprises a plurality of sub-surfaces with the same size during projection, each of the plurality of sub-surfaces corresponding to one optical machine projecting the image, a plurality of fusing zones are formed between the two adjacent images projected by the plurality of optical machines onto corresponding sub-surface, and the plurality of fusing zones are controlled within a predetermined width according to information of the projector spatial position and rotation angle range.

10. A projection system of fully covering the multi-directional circular-screen comprising the visual platform and the projector as claimed of claim 6.

11. The projector of fully covering the multi-directional circular-screen according to claim 6, wherein dividing the visual platform to be projected to obtain the circular-screen projection surface comprises the following steps:
   setting one surface of a cube of the visual platform to be projected as a setting surface, and obtaining preset position information of a center of the setting surface; and
   dividing the visual platform to be projected in accordance with a quadrant, according to the preset position information, to obtain the circular-screen projection surface.

12. The projector of fully covering the multi-directional circular-screen according to claim 6, wherein according to the setting parameters corresponding to each of the plurality of optical machines to be arranged, adjusting the first projection coverage range according to the preset projection surface to obtain the second projection coverage range comprises the following steps:
   obtaining the setting parameters corresponding to each of the plurality of optical machines to be arranged, and the setting parameters comprising a throw ratio, a circular-screen projection surface ratio, a vertical ratio and a keystone correction tolerance;
   adjusting the first projection coverage range according to the throw ratio, the circular-screen projection surface ratio, the vertical ratio and the keystone correction tolerance, and comparing an adjustment result with the preset projection surface; and
   if the adjustment result is consistent with the preset projection surface, obtaining the second projection coverage range.

13. The projector of fully covering the multi-directional circular-screen according to claim 6, wherein calculating the geometric parameters and the second projection coverage range to obtain the spatial position and the rotation angle range of the plurality of optical machines to be arranged comprises the following steps:
   according to the second projection coverage range, adjusting a spatial horizontal position and a rotation angle of each of the plurality of optical machines to be arranged to calculate whether an optical path coverage range of each of the plurality of optical machines to be arranged is within the circular-screen projection surface; and
   when the optical path coverage range of the plurality of optical machines to be arranged is within the circular-screen projection surface, outputting the spatial position and the rotation angle range of each of the plurality of optical machines to be arranged according to the geometric parameters of each of the plurality of optical machines to be arranged.

14. The projector of fully covering the multi-directional circular-screen according to claim 6, further comprising the following steps:
   scanning the circular-screen projection surface to obtain surface horizontal parameters and surface vertical parameters after obtaining the first projection coverage range; and
   adjusting the first projection coverage range according to the setting parameters, the surface horizontal parameters and the surface vertical parameters.

15. The projection system of fully covering the multi-directional circular-screen according to claim 10, wherein the plurality of optical machines are set in a surrounding manner.

16. The projection system of fully covering the multi-directional circular-screen according to claim 15, wherein the number of the plurality of optical machines is four, and the four optical machines are set to project images to corresponding surfaces simultaneously when used for projection.

17. The projection system of fully covering the multi-directional circular-screen according to claim 10, further comprising a projector spatial position and rotation angle range information of output machine; and wherein
   the projector spatial position and rotation angle range information of the output machine being disposed between the plurality of optical machines and the circuit board, the circular-screen projection surface comprises a plurality of sub-surfaces with the same size during projection, each of the plurality of sub-surface corresponding to one optical machine projecting the image, a plurality of fusing zones are formed between the two adjacent images projected by the plurality of optical machines onto corresponding sub-surface, and the plurality of fusing zones are controlled within a predetermined width according to information of the projector spatial position and rotation angle range.

* * * * *